United States Patent
Zlotnick

(12) 
(10) Patent No.: US 6,934,419 B2
(45) Date of Patent: Aug. 23, 2005

(54) ENHANCED COMPRESSION OF GRAY-LEVEL IMAGES

(75) Inventor: Aviad Zlotnick, D.N. Galil Takton (IL)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 10/308,215

(22) Filed: Dec. 2, 2002

(65) Prior Publication Data

US 2003/0133620 A1 Jul. 17, 2003

Related U.S. Application Data

(63) Continuation of application No. 09/547,269, filed on Apr. 11, 2000, now Pat. No. 6,522,784.

(51) Int. Cl.[7] .................................................. G06K 9/36
(52) U.S. Cl. ........................................ 382/245; 382/251
(58) Field of Search .................................. 382/232–253

(56) References Cited

U.S. PATENT DOCUMENTS

| | | | | |
|---|---|---|---|---|
| 5,091,782 A | * | 2/1992 | Krause et al. | ........... 348/400.1 |
| 5,734,753 A | * | 3/1998 | Bunce | ........................ 382/237 |
| 6,522,784 B1 | * | 2/2003 | Zlotnick | ..................... 382/245 |

* cited by examiner

*Primary Examiner*—Jingge Wu
(74) *Attorney, Agent, or Firm*—Darby & Darby

(57) ABSTRACT

A method for compression of an input image that includes a plurality of pixels having respective input pixel values. The method includes quantizing the input pixel values so as to generate respective quantized pixel values, and generating a quantized image by substituting the quantized pixel values for the respective input pixel values in the input image. The input pixel values in the input image are reordered so as to generate a reordered image in which the input pixel values are grouped by their respective quantized values. The quantized image and the reordered image are compressed so as to generate a compressed output image file.

31 Claims, 4 Drawing Sheets

ENHANCED COMPRESSION OF GRAY-LEVEL IMAGES

CROSS-REFERENCE TO RELATED APPLICATION

This application is a continuation of U.S. patent application Ser. No. 09/547,269, filed Apr. 11, 2000, now U.S. Pat. No. 6,522,784.

FIELD OF THE INVENTION

The present invention relates generally to image processing, and specifically to methods of image compression.

BACKGROUND OF THE INVENTION

Various methods of image compression are known in the art. These methods can be categorized generally as lossy and lossless. When lossless compression is used, the original image can be reproduced exactly upon decompression. In general, however, lossy methods achieve higher compression ratios, i.e., smaller compressed image files for a given original image.

One of the most popular methods for lossless compression of gray-scale and color images is the Lempel-Ziv-Welch (LZW) algorithm. This algorithm is described in U.S. Pat. Nos. 4,558,302 and 5,642,112, whose disclosures are incorporated herein by reference. LZW compression uses a dictionary for storing strings of data characters encountered in the input to the algorithm. The input stream, typically a sequence of pixel values in an image, is searched by comparing segments of the input stream to the strings stored in the dictionary in order to find the longest matching string. The dictionary is then augmented by storing an extended string, comprising the longest matching string with the addition of the next input data character following the longest matching segment in the input stream. This procedure continues until the entire image has been compressed.

SUMMARY OF THE INVENTION

It is an object of the present invention to provide improved methods, apparatus and products for image compression.

It is a further object of some aspects of the present invention to provide a method for improving the compression ratio that can be achieved using existing compression algorithms.

In preferred embodiments of the present invention, the pixels in an input image are reordered prior to compression, so as to generate a reordered image having a reduced overall variance. "Overall variance" in this context means a sum or mean of the absolute differences between neighboring pixels in the image. Compression algorithms known in the art, such as the above-mentioned LZW algorithm, typically achieve substantially higher compression ratios when the overall variance is low. Therefore, when the reordered image is compressed, the output image file is substantially smaller than would be achieved without reordering, even taking into account the additional data needed to restore the pixels to their original order following decompression.

In some preferred embodiments of the present invention, the pixel values in the input image are quantized to a selected number of levels. The original pixel values in the image are then reordered so as to group them by their respective quantized values, while keeping the pixels within each group in the order in which they appeared in the input image. The quantized image and the reordered image are both compressed, using any suitable compression algorithm or algorithms known in the art. Preferably, lossless algorithms are used. Most preferably, different algorithms are applied to the quantized image and to the reordered image, chosen so as to maximize the compression ratio in each case. To reconstruct the image, the quantized and reordered images are decompressed. Each pixel in the quantized image is then replaced by its value taken from the reordered image, and the input image is thus reconstructed.

There is therefore provided, in accordance with a preferred embodiment of the present invention, a method for compression of an input image that includes a plurality of pixels having respective input pixel values, including:

quantizing the input pixel values so as to generate respective quantized pixel values;

generating a quantized image by substituting the quantized pixel values for the respective input pixel values in the input image;

reordering the input pixel values in the input image so as to generate a reordered image in which the input pixel values are grouped by their respective quantized values; and compressing the quantized image and the reordered image so as to generate a compressed output image file.

Preferably, quantizing the input pixel values includes dividing the input pixel values into a selected number of ranges, and assigning the pixels whose values are in each of the ranges to a corresponding one of the quantized values.

In a preferred embodiment, quantizing the input pixel values includes quantizing the input pixel values into first and second numbers of quantization levels, and generating the quantized image and reordering the input pixels values include generating a respective quantized image and reordered image for each of the first and second numbers of quantization levels, and compressing the quantized image and the reordered image includes selecting one of the first and second numbers for use in generating the compressed output image file dependent upon which of the first and second numbers gives the smallest output image file.

Preferably, reordering the input pixel values includes copying the input pixel values to the reordered image sequentially according to an order in which the pixels appear in the input image. Most preferably, copying the input pixel values to the reordered image includes copying the input pixel values in raster order. Further preferably, the quantized pixel values include at least first and second quantized values, and copying the input pixel values to the reordered image includes copying the values such that in the reordered image, the pixels belonging to the first quantized value appear in the raster order of the input image, followed in the raster order by the pixels belonging to the second quantized value.

Preferably, compressing the quantized and reordered images includes applying a lossless compression algorithm to at least one of the images, such as a Lempel-Ziv-Welch algorithm.

In preferred embodiments, the method includes storing the output image file in a memory or, alternatively or additionally, transmitting the output image file over a communication link.

There is also provided, in accordance with a preferred embodiment of the present invention, a method for compression of an input image that includes a plurality of pixels having respective input pixel values, including:

reordering the pixels in the input image so as to generate a reordered image having a reduced overall variance relative to the input image; and compressing the reordered image so as to generate a compressed output image file.

There is further provided, in accordance with a preferred embodiment of the present invention, a method for decompressing a compressed image file that includes a compressed quantized image and a compressed reordered image, wherein the quantized image was generated by substituting quantized pixel values for input pixel values of a plurality of pixels in an input image, and wherein the reordered image was generated by grouping the input pixel values by their respective quantized values, the method including:

decompressing the quantized image and the reordered image; and replacing the quantized value of each of the pixels in the decompressed quantized image with a corresponding one of the input pixel values taken from the decompressed reordered image so as to reconstruct the input image.

Preferably, the quantized values include at least first and second quantized values, and replacing the quantized value of each of the pixels includes:

scanning the decompressed quantized image to find the pixels having the first quantized value;

replacing each of the pixels having the first quantized value in sequence with a successive one of the input pixels values taken from the decompressed reordered image;

scanning the decompressed quantized image to find the pixels having the second quantized value; and replacing each of the pixels having the second quantized value in sequence with a successive one of the input pixels values taken from the decompressed reordered image.

There is moreover provided, in accordance with a preferred embodiment of the present invention, apparatus for compression of an input image that includes a plurality of pixels having respective input pixel values, including an image processor, which is adapted to quantize the input pixel values so as to generate respective quantized pixel values and to generate a quantized image by substituting the quantized pixel values for the respective input pixel values in the input image, and further to reorder the input pixel values in the input image so as to generate a reordered image in which the input pixel values are grouped by their respective quantized values, and to compress the quantized image and the reordered image so as to generate a compressed output image file.

In a preferred embodiment, the apparatus includes an image capture device, which is configured to capture the input image and to convey the input image to the processor. In another a preferred embodiment, the apparatus includes a memory, coupled to the processor so as to receive the output image file for storage in the memory. In still another preferred embodiment, the processor is coupled to transmit the output image file over a communication link.

There is additionally provided, in accordance with a preferred embodiment of the present invention, apparatus for compression of an input image that includes a plurality of pixels having respective input pixel values, including an image processor, which is adapted to reorder the pixels in the input image so as to generate a reordered image having a reduced overall variance relative to the input image, and to compress the reordered image so as to generate a compressed output image file.

There is furthermore provided, in accordance with a preferred embodiment of the present invention, apparatus for decompressing a compressed image file that includes a compressed quantized image and a compressed reordered image, wherein the quantized image was generated by substituting quantized pixel values for input pixel values of a plurality of pixels in an input image, and wherein the reordered image was generated by grouping the input pixel values by their respective quantized values, the apparatus including an image processor, which is adapted to decompress the quantized image and the reordered image, and to replace the quantized value of each of the pixels in the decompressed quantized image with a corresponding one of the input pixel values taken from the decompressed reordered image so as to reconstruct the input image.

In a preferred embodiment, the apparatus includes a display, which is coupled to be driven by the image processor to display the reconstructed input image.

There is also provided, in accordance with a preferred embodiment of the present invention, a computer software product for compression of an input image that includes a plurality of pixels having respective input pixel values, the product including a computer-readable medium in which program instructions are stored, which instructions, when read by a computer, cause the computer to quantize the input pixel values so as to generate respective quantized pixel values, and to generate a quantized image by substituting the quantized pixel values for the respective input pixel values in the input image, and further to reorder the input pixel values in the input image so as to generate a reordered image in which the input pixel values are grouped by their respective quantized values, and to compress the quantized image and the reordered image so as to generate a compressed output image file.

There is further provided, in accordance with a preferred embodiment of the present invention, a computer software product for compression of an input image that includes a plurality of pixels having respective input pixel values, the product including a computer-readable medium in which program instructions are stored, which instructions, when read by a computer, cause the computer to reorder the pixels in the input image so as to generate a reordered image having a reduced overall variance relative to the input image, and to compress the reordered image so as to generate a compressed output image file.

There is additionally provided, in accordance with a preferred embodiment of the present invention, a computer software product for decompressing a compressed image file that includes a compressed quantized image and a compressed reordered image, wherein the quantized image was generated by substituting quantized pixel values for input pixel values of a plurality of pixels in an input image, and wherein the reordered image was generated by grouping the input pixel values by their respective quantized values, the product including a computer-readable medium in which program instructions are stored, which instructions, when read by a computer, cause the computer to decompress the quantized image and the reordered image, and to replace the quantized value of each of the pixels in the decompressed quantized image with a corresponding one of the input pixel values taken from the decompressed reordered image so as to reconstruct the input image.

The present invention will be more fully understood from the following detailed description of the preferred embodiments thereof, taken together with the drawings in which:

DETAILED DESCRIPTION OF PREFERRED EMBODIMENTS

Figure 1:
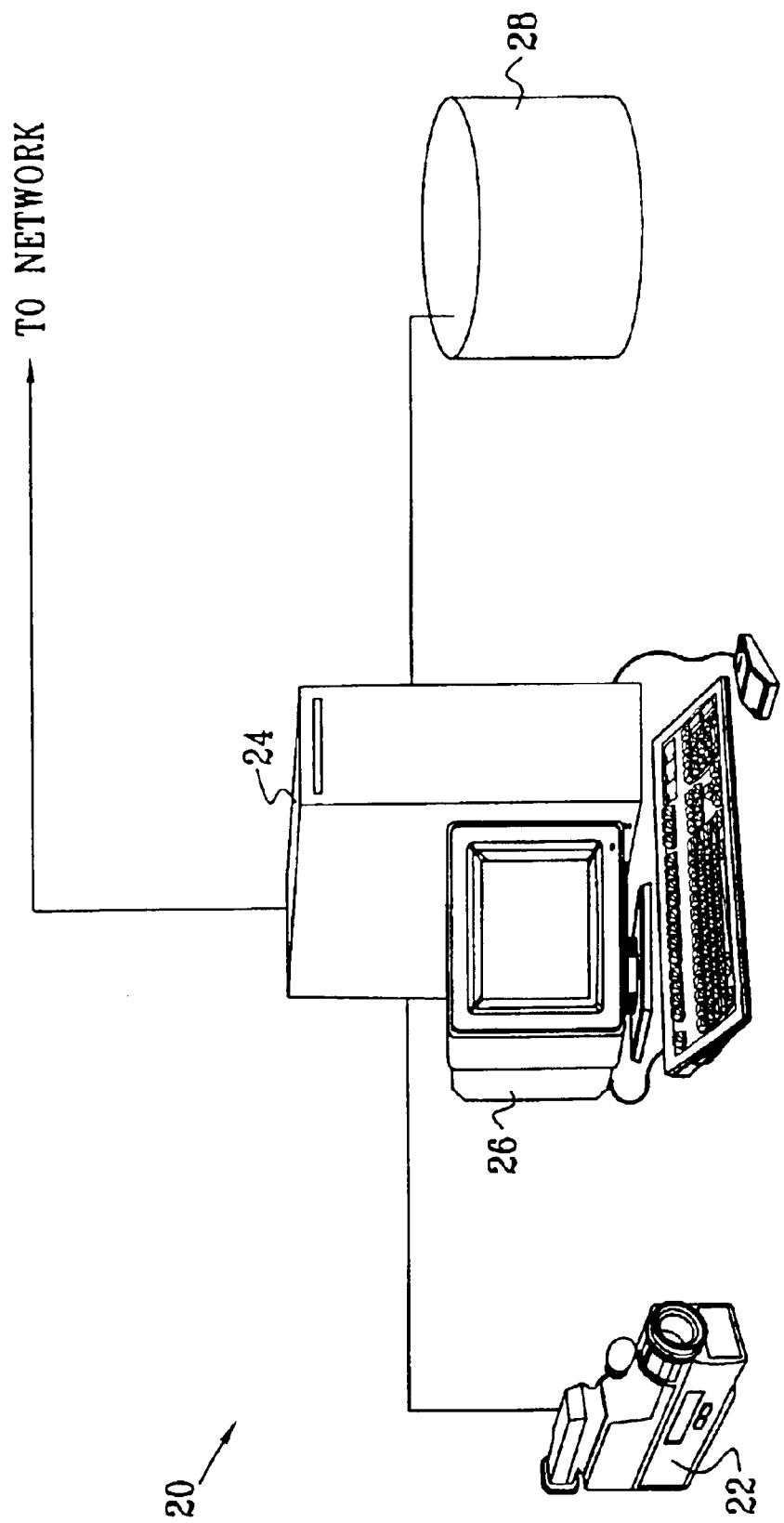
FIG. 1 is a schematic pictorial illustration of image compression apparatus, in accordance with a preferred embodiment of the present invention.

FIG. 1 is a schematic, pictorial illustration of a system 20 for capture and compression of images, in accordance with a preferred embodiment of the present invention. System 20 comprises an image input device 22, such as a video camera, a scanner, or any other suitable type of image capture device known in the art. Device 22 captures a gray-level or color image of an object and conveys the corresponding image data to an image processor 24, typically comprising a suitable general-purpose computer. Alternatively, the gray-level image is input to the processor from another source. Processor 24 compresses the image and stores the resultant compressed image data in a memory 28, such as a magnetic or optical disk. Additionally or alternatively, the compressed data are transmitted to another computer over a network. When the image is to be reviewed, the relevant data are recalled by processor 24 (or by any other suitable processor), and are then decompressed and displayed on a display screen 26. Alternatively, the decompressed image is printed by a suitable printer (not shown) or is processed further, for example to extract information from the image, using methods of image processing and analysis known in the art.

The image compression and decompression functions are preferably performed using software running on processor 24, which implements the principles of the present invention, as described in detail hereinbelow. The software may be supplied on tangible media, such as CD-ROM or non-volatile memory, and loaded into the processor. Alternatively, the software may be down-loaded to the processor via a network connection or other electronic link. Further alternatively, processor 24 may comprise dedicated, hard-wired elements or a digital signal processor for carrying out the image compression and/or decompression steps.

Figure 2:
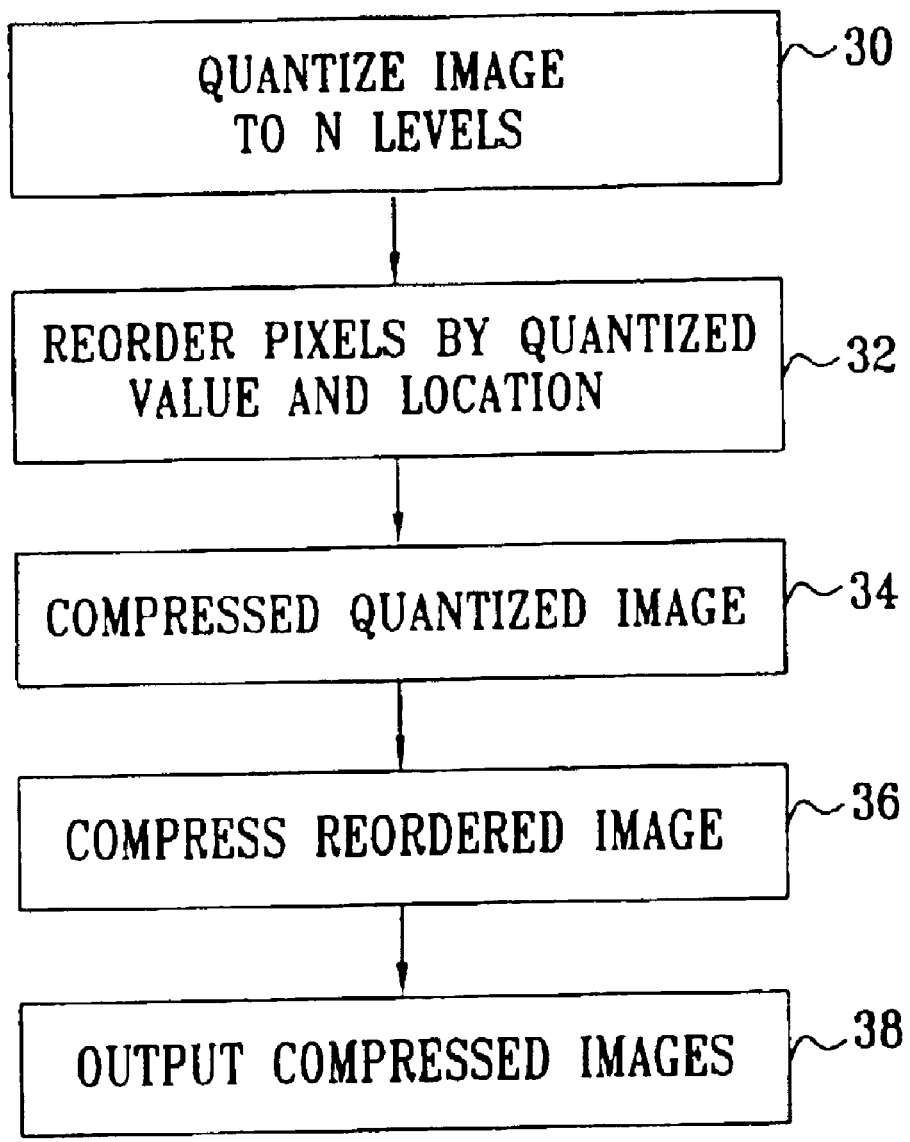
FIG. 2 is a flow chart that schematically illustrates a method for image compression, in accordance with a preferred embodiment of the present invention.
Figure 3:
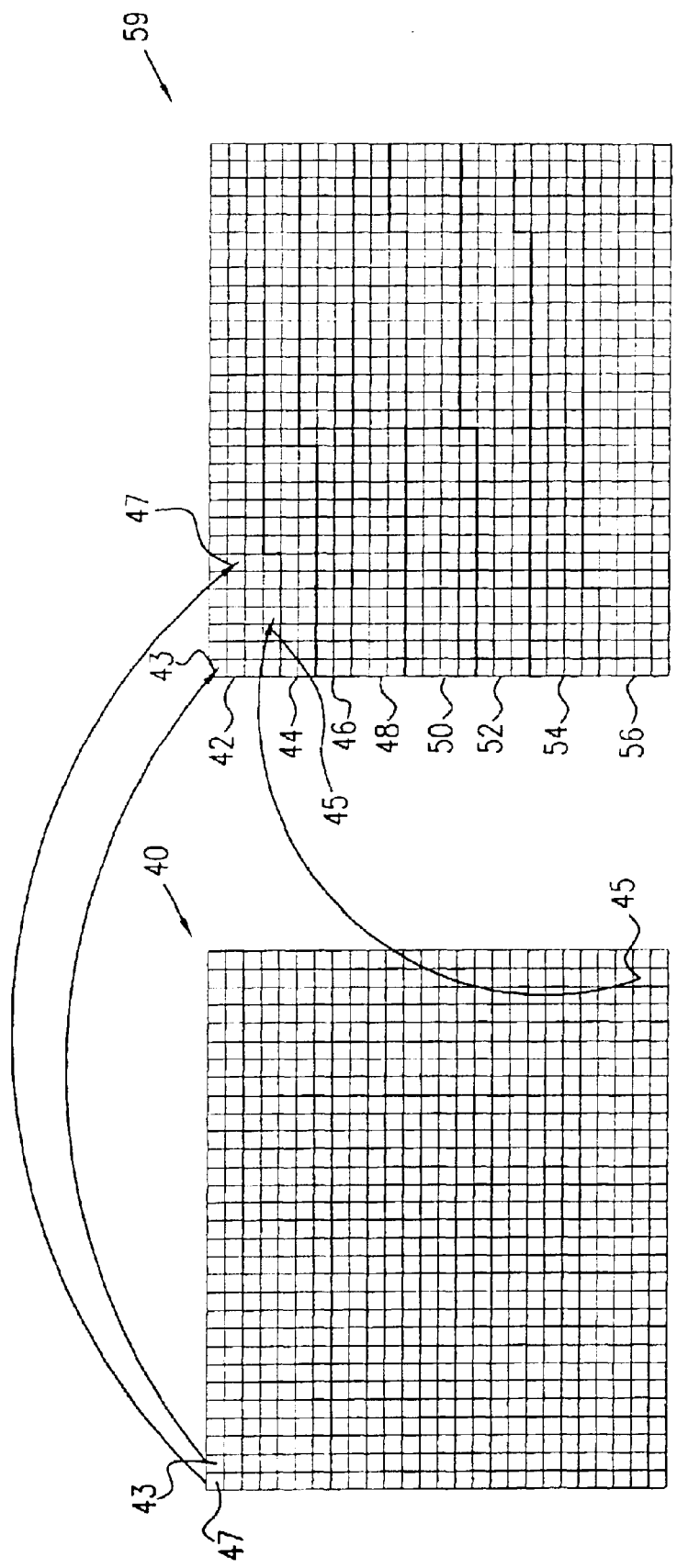
FIG. 3 is a schematic representation of a matrix of pixels in an input image and in a reordered image that is formed from the input image in accordance with the method of FIG. 2.

Reference is now made to FIGS. 2 and 3, which schematically illustrate a method for image compression, in accordance with a preferred embodiment of the present invention. FIG. 2 is a flow chart showing the steps in the method. FIG. 3 shows an original input image 40 and a reordered image 59, generated from the input image in accordance with the method of FIG. 2. Image 40 comprises a plurality of pixels, such as pixels 43, 45 and 47. Each of the pixels has a given pixel value, typically an 8-bit number, representing the gray level of the pixel in the image. On the other hand, image 40 may be a color image, in which case the pixel values preferably comprise red, green and blue levels of each pixel or, alternatively, luminance and chrominance values, as is known in the art.

At a quantization step 30, the pixel values in image 40 are quantized into a selected number of quantization levels N. N may have substantially any value greater than or equal to two. Substantially any criteria may be used for determining to which quantized level each pixel in the image should be assigned. For optimal speed of execution, quantization is preferably accomplished simply by truncating the pixel values. Alternatively, optimal quantization thresholds may be determined adaptively, based on histogram analysis, for example, and the thresholds may even vary over the area of the image.

At a pixel reordering step 32, the original pixel values are mapped sequentially to reordered image 59 according to their respective quantization levels and their order in image 40. For the sake of illustration, image 59 is divided into eight regions 42, 44, 46, 48, 50, 52, 54 and 56, each corresponding to one of eight quantization levels, going from darkest to brightest pixel values in the image. Pixel 43, which is the first pixel in the lowest quantization level from the beginning of the raster of pixels in image 40, is mapped to the first pixel location in image 59. Pixel 45, one of the last pixels in image 40 belonging to the lowest quantization level, is mapped to a location near the end of region 42 in image 59. Pixel 47, the first pixel in the next-higher quantization level, is mapped to the beginning of region 44.

In this manner, all of the pixels in image 40 are mapped in succession, yielding two images: a quantized image, in which the pixels remain in their original order; and reordered image 59, in which the pixel values retain their full gray-level (or color) content, but are reordered according to their quantization levels. The outcome of this reordering is that the variance of both the quantized image and reordered image, in terms of the absolute differences between the pixel values of neighboring pixels, is substantially reduced relative to original image 40.

At compression steps 34 and 36, the quantized image and the reordered image are respectively compressed. Substantially any suitable algorithm known in the art may be used for this purpose, and different algorithms may be applied to the quantized and reordered images. Following compression, an image file containing both of the compressed images is output, at an image output step 38. The inventor has applied the method of FIGS. 2 to 73 different gray-scale images, using quantization at N=2. G4 compression was applied to the quantized images, while LZW compression was applied to the reordered images. ("G4" refers to Group 4, or MMR compression, specified by the International Telecommunications Union ITU-T.) An average improvement of about 5% in the compression ratio of the output file was achieved relative to that obtained using LZW alone on the original images without reordering. The improvement in the compression ratio stems from the fact that LZW, as well as other compression algorithms known in the art, works more effectively when the image variance is reduced.

How much the variance is reduced is a function of the original image content and the number of quantization levels N. Optionally, steps 30 through 36 are repeated for two or more different values of N, and the value giving the best compression ratio is chosen. As another option, steps 30 and 32 may be applied recursively to the quantized image, with a smaller number of quantization levels in each recursion. Preferably, for each region of each of the resultant reordered images, the number of bits per pixel is reduced by storing not the complete gray-level value, but rather the difference between the gray-level value and an appropriate threshold. (This step may likewise be applied to reordered image 59 even without recursion.) As a result, although four or more images will need to be compressed and stored, the low variance of these images may result in an output file having a still better compression ratio than could be achieved without recursion.

Furthermore, although the pixels in image 59 are arranged serially along the raster, other reordering schemes are also possible. For example, each level may be allocated one sector of the reordered image, such as a quadrant of the image in the case that four quantization levels are used.

Figure 4:
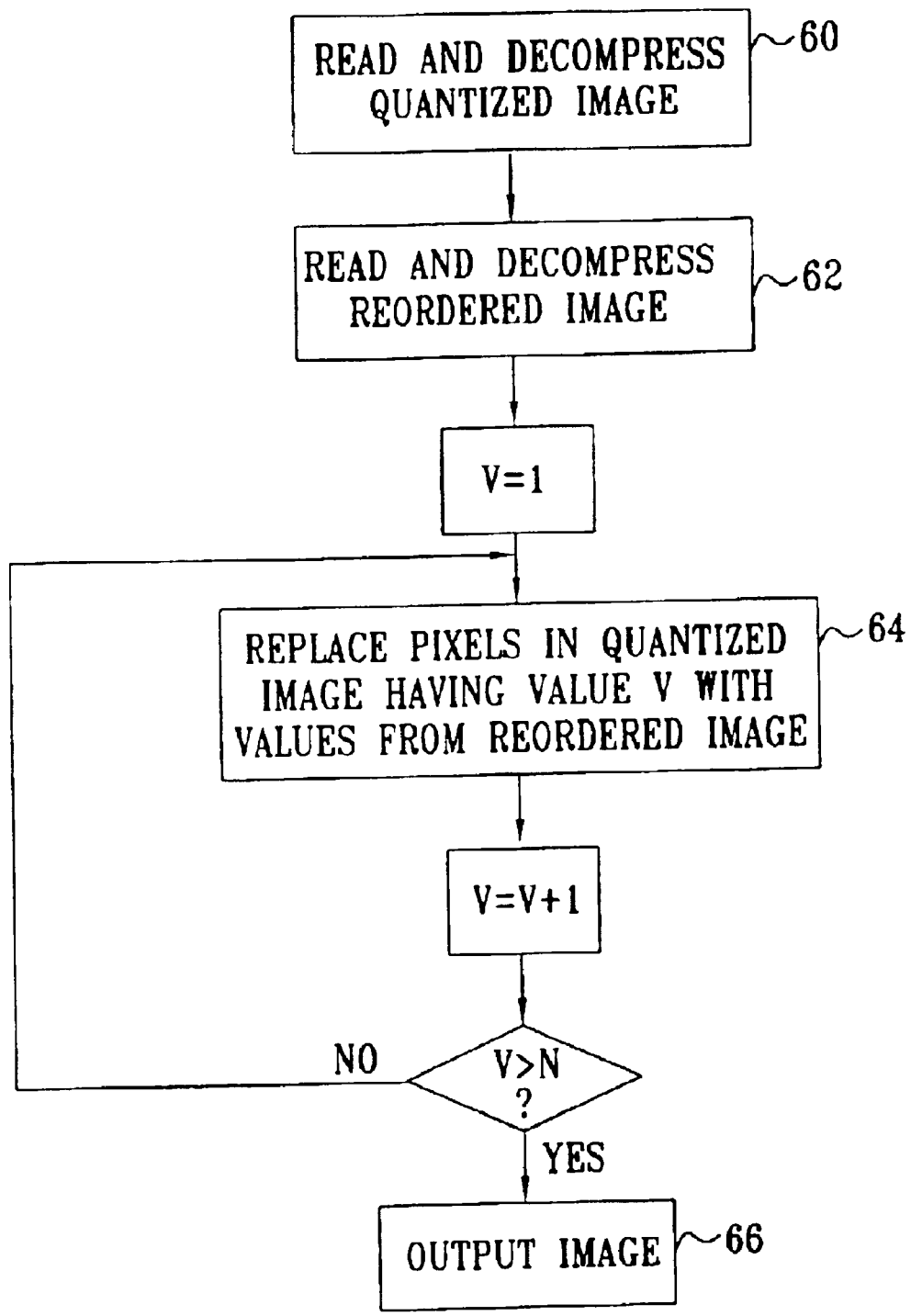
FIG. 4 is a flow chart that schematically illustrates a method for image decompression, in accordance with a preferred embodiment of the present invention.

FIG. 4 is a flow chart that schematically illustrates a method for decompression of an image file that was compressed using the method of FIG. 2, in accordance with a preferred embodiment of the present invention. The method begins at decompression steps 60 and 62, wherein the compressed quantized image and reordered image are respectively read from the output file produced at step 38 and are decompressed using the appropriate decompression algorithm.

At a pixel replacement step 64, the quantized pixel values in the decompressed quantized image are replaced by the corresponding values from the reordered image. To accomplish this replacement, the quantized image is preferably scanned in raster order for pixels belonging the first quantization level. This is the lowest level in the example of FIG. 3, whose pixel values are stored in region 42 of image 59. At this stage, the values of pixels 43 and 45 are mapped back to their appropriate locations in image 40. This process of scanning and replacing the pixel values is then repeated for all of the remaining quantization levels in order, until all of the pixel values have been mapped back to their original locations. Because the pixel values were stored in image 59 in raster order, there is no need in this step for pointers or other ancillary data beyond the quantized image itself.

At an image output step 66, the original image 40 is reconstructed and output, for display on screen 26, for example. Assuming a lossless algorithm, such as LZW, was used at steps 34 and 36 (FIG. 2), the original image is reproduced exactly, with no loss of information. Alternatively, a lossy algorithm may also be used.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for compression of an input image that includes a plurality of pixels having respective input pixel values with a given level of precision, comprising:
    quantizing the input pixel values so as to generate respective quantized pixel values;
    generating a quantized image by substituting the quantized pixel values for the respective input pixel values in the input image;
    reordering the input pixel values in the input image so as to generate a reordered image in which the input pixel values are grouped by their respective quantized values, while the level of precision of the input pixel values is maintained; and
    compressing the quantized image and the reordered image so as to generate a compressed output image file.

2. A method according to claim 1, wherein quantizing the input pixel values comprises dividing the input pixel values into a selected number of ranges, and assigning the pixels whose values are in each of the ranges to a corresponding one of the quantized values.

3. A method according to claim 1, wherein quantizing the input pixel values comprises quantizing the input pixel values into first and second numbers of quantization levels, and wherein generating the quantized image and reordering the input pixels values comprise generating a respective quantized image and reordered image for each of the first and second numbers of quantization levels, and wherein compressing the quantized image and the reordered image comprises selecting one of the first and second numbers for use in generating the compressed output image file dependent upon which of the first and second numbers gives the smallest output image file.

4. A method for compression of an input image that includes a plurality of pixels having respective input pixel values, comprising:
    quantizing the input pixel values so as to generate respective quantized pixel values;
    generating a quantized image by substituting the quantized pixel values for the respective input pixel values in the input image;
    reordering the input pixel values in the input image so as to generate a reordered image in which the input pixel values are grouped by their respective quantized values; and
    compressing the quantized image and the reordered image so as to generate a compressed output image file,
    wherein reordering the input pixel values comprises copying the input pixel values to the reordered image sequentially according to an order in which the pixels appear in the input image.

5. A method according to claim 4, wherein copying the input pixel values to the reordered image comprises copying the pixel values in raster order.

6. A method according to claim 5, wherein the quantized pixel values comprise at least first and second quantized values, and wherein copying the input pixel values to the reordered image comprises copying the values such that in the reordered image, the pixels belonging to the first quantized value appear in the raster order of the input image, followed in the raster order by the pixels belonging to the second quantized value.

7. A method according to claim 1, wherein compressing the quantized and reordered images comprises applying a lossless compression algorithm to at least one of the images.

8. A method according to claim 7, wherein the algorithm comprises a Lempel-Ziv-Welch algorithm.

9. A method according to claim 1, and comprising storing the output image file in a memory.

10. A method according to claim 1, and comprising transmitting the output image file over a communication link.

11. A method for decompressing a compressed image file that includes a compressed quantized image and a compressed reordered image, wherein the quantized image was generated by substituting quantized pixel values for input pixel values of a plurality of pixels in an input image, the input pixel values having a given level of precision that is greater than the precision of the quantized pixel values, and wherein the reordered image was generated by grouping the input pixel values by their respective quantized values, the method comprising:
    decompressing the quantized image and the reordered image; and
    replacing the quantized value of each of the pixels in the decompressed quantized image with a corresponding one of the input pixel values taken from the decompressed reordered image, with the given level of precision that is greater than the precision of the quantized pixel values, so as to reconstruct the input image such that the level of precision of the input pixel values is maintained in the reconstructed image.

12. A method for decompressing a compressed image file that includes a compressed quantized image and a compressed reordered image, wherein the quantized image was generated by substituting quantized pixel values for input pixel values of a plurality of pixels in an input image, and wherein the reordered image was generated by grouping the input pixel values by their respective quantized values, the method comprising:

decompressing the quantized image and the reordered image; and replacing the quantized value of each of the pixels in the decompressed quantized image with a corresponding one of the input pixel values taken from the decompressed reordered image so as to reconstruct the input image, wherein the quantized values comprise at least first and second quantized values, and wherein replacing the quantized value of each of the pixels comprises:

scanning the decompressed quantized image to find the pixels having the first quantized value;

replacing each of the pixels having the first quantized value in sequence with a successive one of the input pixels values taken from the decompressed reordered image;

scanning the decompressed quantized image to find the pixels having the second quantized value; and replacing each of the pixels having the second quantized value in sequence with a successive one of the input pixels values taken from the decompressed reordered image.

13. Apparatus for compression of an input image that includes a plurality of pixels having respective input pixel values with a given level of precision, comprising an image processor, which is adapted to quantize the input pixel values so as to generate respective quantized pixel values and to generate a quantized image by substituting the quantized pixel values for the respective input pixel values in the input image, and further to reorder the input pixel values in the input image so as to generate a reordered image in which the input pixel values are grouped by their respective quantized values, while the level of precision of the input pixel values is maintained, and to compress the quantized image and the reordered image so as to generate a compressed output image file.

14. Apparatus according to claim 13, and comprising an image capture device, which is configured to capture the input image and to convey the input image to the processor.

15. Apparatus according to claim 13, and comprising a memory, coupled to the processor so as to receive the output image file for storage in the memory.

16. Apparatus according to claim 13, wherein the processor is coupled to transmit the output image file over a communication link.

17. Apparatus according to claim 13, wherein the image processor is arranged to divide the input pixel values into a selected number of ranges, and to assign the pixels whose values are in each of the ranges to a corresponding one of the quantized values.

18. Apparatus according to claim 13, wherein the image processor is arranged to quantize the input pixel values into first and second numbers of quantization levels, and to generate a respective quantized image and reordered image for each of the first and second numbers of quantization levels, and to select one of the first and second numbers for use in generating the compressed output image file dependent upon which of the first and second numbers gives the smallest output image file.

19. Apparatus for compression of an input image that includes a plurality of pixels having respective input pixel values, comprising an image processor, which is adapted to quantize the input pixel values so as to generate respective quantized pixel values and to generate a quantized image by substituting the quantized pixel values for the respective input pixel values in the input image, and further to reorder the input pixel values in the input image so as to generate a reordered image in which the input pixel values are grouped by their respective quantized values, and to compress the quantized image and the reordered image so as to generate a compressed output image file, wherein the image processor is arranged to copy the input pixel values to the reordered image sequentially according to an order in which the pixels appear in the input image.

20. Apparatus according to claim 19, wherein the image processor is arranged to copy the input pixel values in raster order.

21. Apparatus according to claim 20, wherein the quantized pixel values comprise at least first and second quantized values, and wherein the image processor is arranged to copy the input pixel values to the reordered image such that in the reordered image, the pixels belonging to the first quantized value appear in the raster order of the input image, followed in the raster order by the pixels belonging to the second quantized value.

22. Apparatus according to claim 13, wherein the image processor is arranged to apply a lossless compression algorithm to at least one of the images.

23. Apparatus according to claim 22, wherein the algorithm comprises a Lempel-Ziv-Welch algorithm.

24. Apparatus for decompressing a compressed image file that includes a compressed quantized image and a compressed reordered image, wherein the quantized image was generated by substituting quantized pixel values for input pixel values of a plurality of pixels in an input image, the input pixel values having a given level of precision that is greater than the precision of the quantized pixel values, and wherein the reordered image was generated by grouping the input pixel values by their respective quantized values, the apparatus comprising an image processor, which is adapted to decompress the quantized image and the reordered image, and to replace the quantized value of each of the pixels in the decompressed quantized image with a corresponding one of the input pixel values taken from the decompressed reordered images, with the given level of precision that is greater than the precision of the quantized pixel values, so as to reconstruct the input image such that the level of precision of the input pixel values is maintained in the reconstructed image.

25. Apparatus according to claim 24, comprising a display, which is coupled to be driven by the image processor to display the reconstructed input image.

26. A computer software product for compression of an input image that includes a plurality of pixels having respective input pixel values with a given level of precision, the product comprising a computer-readable medium in which program instructions are stored, which instructions, when read by a computer, cause the computer to quantize the input pixel values so as to generate respective quantized pixel values, and to generate a quantized image by substituting the quantized pixel values for the respective input pixel values in the input image, and further to reorder the input pixel values in the input image so as to generate a reordered image in which the input pixel values are grouped by their respective quantized values, while the level of precision of the input pixel values is maintained, and to compress the quantized image and the reordered image so as to generate a compressed output image file.

27. A product according to claim 26, wherein the instructions cause the computer to divide the input pixel values into a selected number of ranges, and to assign the pixels whose values are in each of the ranges to a corresponding one of the quantized values.

28. A product according to claim 26, wherein the instructions cause the computer to quantize the input pixel values into first and second numbers of quantization levels, and to generate a respective quantized image and reordered image for each of the first and second numbers of quantization levels, and to select one of the first and second numbers for use in generating the compressed output image file dependent upon which of the first and second numbers gives the smallest output image file.

29. A product according to claim 26, wherein the instructions cause the computer to apply a lossless compression algorithm to at least one of the images.

30. A product according to claim 26, wherein the algorithm comprises a Lempel-Ziv-Welch algorithm.

31. A computer software product for decompressing a compressed image file that includes a compressed quantized image and a compressed reordered image, wherein the quantized image was generated by substituting quantized pixel values for input pixel values of a plurality of pixels in an input image, the input pixel values having a given level of precision that is greater than the precision of the quantized pixel values, and wherein the reordered image was generated by grouping the input pixel values by their respective quantized values, the product comprising a computer-readable medium in which program instructions are stored, which instructions, when read by a computer, cause the computer to decompress the quantized image and the reordered image, and to replace the quantized value of each of the pixels in the decompressed quantized image with a corresponding one of the input pixel values taken from the decompressed reordered image, with the given level of precision that is greater than the precision of the quantized pixel values, so as to reconstruct the input image such that the level of precision of the input pixel values is maintained in the reconstructed image.

* * * * *